United States Patent Office 2,829,086
Patented Apr. 1, 1958

2,829,086

DENTAL PREPARATIONS COMPRISING HIGHER ALIPHATIC PERFLUORINATED ACID COMPOUNDS

Hans George Kirschenbauer, Allendale, N. J., assignor to Colgate Palmolive Company, Jersey City, N. J., a corporation of Delaware No Drawing. Application September 21, 1954
Serial No. 457,531

7 Claims. (Cl. 167—93)

The present invention relates to dental preparations comprising a higher aliphatic perfluorinated carboxylic acid compound.

The perfluorinated compounds represent a special class of relatively new materials which have been suggested broadly for a variety of possible applications such as intermediates in the preparation of polymers, as wetting or surface active agents, as ingredients in the formation of water-repellent coatings and the like. Perfluorocarboxylic acids and a process for their manufacture are described, for example, in Ind. & Eng. Chemistry, vol. 43 (1951), page 2332.

According to the present invention, improved dental compositions may be prepared by the incorporation of a higher aliphatic perfluorinated carboxylic acid compound. Such products exhibit marked beneficial anti-bacterial activity which is of particular desirability in such preparations.

These active ingredients correspond in structure to the higher aliphatic carboxylic acid compounds wherein all replaceable hydrogen atoms attached to carbon atoms in the aliphatic chain have been replaced by fluorine atoms. It is preferred to use the higher saturated perfluoro fatty acid or alkanoic monocarboxylic acid compounds which have the formula $F(CF_2)_nCOOX$ or the equivalent $C_nF_{2n+1}COOX$, wherein $n$ is an integer of at least 5, such as 5–17 and preferably 7–11, and X is selected from the group consisting of hydrogen and water-soluble salt-forming cations. The fatty acid or acyl radical, therefore, will have usually about 6–18, and preferably 8–12 carbon atoms. These fully fluorinated saturated fatty acid compounds in the form of their free acids are very strongly acidic in water. It is preferred therefore to use the corresponding salts which are slightly acid to substantially neutral usually, and exhibt greater solubility in water. The free acids may be employed, however, and reacted with suitable alkaline materials to form salts or otherwise the pH of the preparation may be appropriately adjusted during manufacture of the dental composition for example. These salts include, for example, the alkali-metal (e. g. sodium, potassium, lithium), ammonium and mono-, di- and tri-ethanolamine salts of perfluoro caproic acid, perfluoro caprylic acid, perfluoro capric, perfluoro lauric, perfluoro myristic, perfluoro palmitic and stearic acids, and the like. These perfluoro alkanoic acid compounds are generally obtained as mixtures of variable chain length depending upon their method of manufacture, and it is economical and within the scope of the present invention to use the mixed acid compounds.

These compounds exhibit many highly unusual and beneficial characteristics of particular desirability in dental preparations. Among the unusual properties is their anti-bacterial power on the oral flora (the complex mixture of micro-organisms normally present in the mouth). These compounds exhibit a superior inhibiting effect on bacterial growth and the production of acid from fermentable carbohydrates by these micro-organisms found in saliva. This superior inhibiting effect may be illustrated by the Snyder dilution test which is known in the art. In accordance with this test, a very small portion of these compounds may be added to Snyder tubes containing a nutrient dextrose agar with brom-cresol green indicator which has been inoculated previously with saliva. After 72 hours incubation at 37° C., the tubes containing these compounds are still green in color indicating marked inhibition of acid production with no evidence of bacterial growth. As a control, similar tubes without the addition of these compounds have turned yellow after only 24 hours incubation indicative of rapid and substantial acid formation, with the formation of bacterial colonies. For example, the minimum amount of sodium perfluoro octanoic acid which is necessary to maintain a predominantly green color for 72 hours in the Snyder test is an amount corresponding to about 30 milligrams per 100 cc. of saliva.

These active ingredients exhibit also the unusual property of being adsorbed and released from proteinaceous material to exert such anti-bacterial effects. By reason thereof, they may have prolonged activity in such applications where adsorption is possible. This protein adsorption phenomenon is highly specific and may be illustrated as follows. A small amount of casein or essentially equivalent material such as mucin is immersed in a dilute solution of the ingredient to be tested, and it is washed and dried thereafter. The treated protein is then added to the above-described Snyder medium inoculated with the saliva. If a predominantly green color persists after about 72 hours incubation, then a sufficient amount of the active ingredient must have been retained by the protein and released subsequently in the Snyder medium. In such test, these perfluorinated active ingredients show a superior anti-bacterial effect on the oral flora even after adsorption on the protein. For example, it has been found that an amount of sodium perfluoro octanoic acid equivalent to 1000 mg. per 100 cc. of saliva is sufficient to maintain a predominantly green color in the Synder medium using casein in the above test. The perfluorodecanoic acid is effective similarly and the ammonium perfluoro caprylate exhibits an activity at a minimum of about 4000–5000 mg. This property is highly specific to these active ingredients since ordinary wetting or detersive agents such as soap and sulfonated materials in general do not exhibit such activity.

These active ingredients are used in any preparation, as hereinafter described and claimed, designed for application to the oral cavity, which preparations are referred to herein as dental preparations. Such dental preparations include suitable toothpastes and dental creams, tooth powders, lozenges, tablets, chewing gum, dental floss and the like.

Any suitable amount of these compounds may be incorporated in the dental preparation. The specific amount will vary, naturally, depending upon the specific type of preparation and the specific effects desired, but will generally be a minor amount of the composition, usually at least about 0.05 and up to about 20% by weight. In the case of dentifrices such as dental creams, it is usual to use an amount up to about 10% and preferably up to about 5% by weight.

Any suitable practically water-insoluble polishing agent may be admixed with these novel compounds in the preparation of the dentifrice compositions such as tooth powders, pastes, creams, and the like. There is a relatively large number of such materials known in the art. Representative materials include, for example, dicalcium phosphate, tricalcium phosphate, insoluble sodium metaphosphate, aluminum hydroxide, magnesium carbonate, calcium sulfate, bentonite, etc., including suitable mixtures thereof. It is preferred to use the water-insoluble calcium or magnesium salts as the polishing agents and, more particularly, calcium carbonate and/or a calcium phosphate, such as dicalcium phosphate dihydrate. In general, these polishing agents will comprise a major proportion by weight of the solid ingredients. The polishing agent content is variable, but will generally be up to about 95% by weight of the total composition. In the case of a dental cream such polishing agents will generally be about 20–75% whereas in tooth powders, the polishing agents will usually be in greater proportion, such as about 70–95%.

In the preparation of tooth powders, it is usually sufficient to mechanically admix the various solid ingredients.

In dental cream formulations, the liquids and solids should necessarily be proportioned to form a creamy mass of desired consistency which is extrudable from a collapsible aluminum or lead tube. In general, the liquids in the dental cream will comprise chiefly water, glycerine, sorbitol, propylene glycol, etc., including suitable mixtures thereof. It is advantageous usually to use a mixture of both water and a humectant or binder such as glycerine or sorbitol. The total liquid content will generally be about 20–75% by weight of the formulation. It is preferred to use also a gelling agent in dental creams such as the natural and synthetic gums and gum-like materials, e. g., Irish moss, gum tragacanth, sodium carboxymethylcellulose, polyvinylpyrrolidone, starch, and the like, usually in an amount up to about 10%, and preferably about 0.5–5% of the formulation.

Various adjuvant materials may be incorporated in such dental preparations. Added materials in the formulation which do not substantially adversely affect the properties and characteristics may be suitably selected and used in proper amount depending upon the particular type of preparation. Such materials may be used as soluble saccharin, flavoring oils (e. g., oils of spearmint, peppermint, wintergreen), coloring or whitening agents (e. g., titanium dioxide), preservatives (e. g., sodium benzoate, etc.,), alcohol, menthol, and the like. Various other materials may be added such as higher fatty acid amides of amino carboxylic acid compounds, e. g., sodium lauroyl and palmitoyl sarcosides. Other suitable materials are chlorophyllin and various ammoniated ingredients, such as urea, diammonium phosphate and mixtures thereof.

In the case of chewing gum and other products, the active ingredients may be incorporated in any suitable manner during the usual manufacture of the product. For example, they may be incorporated in a warm gum base with stirring to distribute the same uniformly therein. It may also be added to the exterior or outer surfaces of a gum base in order to coat the base. The usual gum bases may be used, representative materials being jelutong, rubber latex, vinylite resins, etc., in addition to other usual materials such as plasticizers or softeners, sugar or other suitable carbohydrates such as glucose, sorbitol, etc.

Other indicated types of compositions will be formulated in known manner also.

The following specific examples are further illustrative of the nature of the present invention but it is to be understood that the invention is not limited thereto. The preparations may be prepared in the usual manner and all amounts of the various ingredients are by weight unless otherwise specified.

Example I.—Dental cream

| | Percent |
|---|---|
| Ammonium perfluoro caprylate | 2.00 |
| Dicalcium phosphate dihydrate | 45.00 |
| Glycerine | 28.30 |
| Water | 20.15 |
| Tetrasodium pyrophosphate | 1.00 |
| Irish moss gum | 0.95 |
| | 97.40 | the balance consisting essentially of soluble saccharin, flavor and preservatives.

In the above dental cream, the substitution of about 1–2% sodium N-lauroyl sarcoside for 1% of perfluoro compound produces a satisfactory dental cream also.

Example II.—Tooth powder

| | Percent |
|---|---|
| Sodium perfluoro caprylate | 3.0 |
| Calcium carbonate | 25.0 |
| Dicalcium phosphate dihydrate | 70.0 |
| Flavor | 1.6 |
| Saccharin, soluble | 0.4 |

Example III.—Chewing gum

| | Percent |
|---|---|
| Sodium perfluoro caprylate | 0.5 |
| Gum base, e. g. chicle | 20.0 |
| Sucrose | 60.0 |
| Corn syrup | 18.5 |
| Flavor | 1.0 |

Although the present invention has been described with reference to particular embodiments and examples, it will be apparent to those skilled in the art that variations and modifications of this invention can be made and the equivalents can be substituted therefor without departing from the principles and true spirit of the invention.

Having thus described the invention, what is claimed is:

1. A dental preparation comprising a polishing agent and about 0.05 to 20% by weight of a higher saturated perfluoro fatty acid compound having at least 6 carbon atoms in the fatty acid radical.

2. A dental preparation comprising a polishing agent and about 0.05 to 10% by weight of a water-soluble salt of a higher saturated perfluoro fatty acid of about 8–12 carbon atoms.

3. A dental preparation in accordance with claim 2 which contains the ammonium salt of perfluoro caprylic acid.

4. A dental preparation in accordance with claim 2 which contains the sodium salt of perfluoro caprylic acid.

5. A dental preparation in accordance with claim 2 which contains the water-soluble salt of perfluoro decanoic acid.

6. A dental cream comprising a liquid vehicle, at least about 20% by weight of polishing material suspended therein, and about 0.05 to 10% by weight of a higher saturated perfluoro fatty acid compound having about 8 to 12 carbon atoms in the fatty acyl radical.

7. A dental preparation comprising about 0.05 to 20% by weight of a higher saturated perfluoro fatty acid compound having at least 6 carbon atoms in the fatty acyl radical and a solid dental carrier therefor.

References Cited in the file of this patent

UNITED STATES PATENTS

| | | |
|---|---|---|
| 2,527,686 | Sandberg | Oct. 31, 1950 |
| 2,606,812 | Bruce | Aug. 12, 1952 |
| 2,627,493 | Merckie | Feb. 3, 1953 |
| 2,692,264 | Wojcik | Oct. 19, 1954 |

FOREIGN PATENTS

| | | |
|---|---|---|
| 644,360 | Great Britain | Oct. 11, 1950 |
| 295,246 | Switzerland | Feb. 16, 1954 |